(12) United States Patent
Chang et al.

(10) Patent No.: US 7,206,910 B2
(45) Date of Patent: Apr. 17, 2007

(54) DELTA OBJECT REPLICATION SYSTEM AND METHOD FOR CLUSTERED SYSTEM

(75) Inventors: Kevin K. Chang, Valinda, CA (US); Harlan B. Sexton, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 245 days.

(21) Appl. No.: 10/321,336

(22) Filed: Dec. 17, 2002

(65) Prior Publication Data
US 2004/0117571 A1    Jun. 17, 2004

(51) Int. Cl.
*G06F 12/00* (2006.01)

(52) U.S. Cl. .................. 711/162; 711/156; 711/145

(58) Field of Classification Search ........... 711/141, 711/145, 161, 165, 162; 707/203
See application file for complete search history.

(56) References Cited

U.S. PATENT DOCUMENTS

| | | | |
|---|---|---|---|
| 5,127,104 A * | 6/1992 | Dennis | 712/201 |
| 5,937,414 A * | 8/1999 | Souder et al. | 707/203 |
| 6,233,589 B1 | 5/2001 | Balcha et al. | |
| 6,304,882 B1 | 10/2001 | Strellis et al. | |
| 6,412,017 B1 * | 6/2002 | Straube et al. | 719/313 |
| 6,845,378 B1 * | 1/2005 | Pauly et al. | 707/101 |

FOREIGN PATENT DOCUMENTS

| | | |
|---|---|---|
| WO | WO 00/28421 | 5/2000 |
| WO | WO 01/29653 A1 | 4/2001 |

OTHER PUBLICATIONS

International Search Report dated Aug. 5, 2004.
Marcia Pasin, Michel Riveill, Taisy Silva Weber: "High- Available Enterprise JavaBeans Using Group Communication System Support" European Research Seminar on Advances . . . .
Clustering Technologies in Memory Session Replication in Tomcast Apr. 4, 2002, (http://www.theserverside.com/resources/articles/Tomcat/article.html.
Marcia Pasin et al., High Available Enterprise JavaBeans Using Group Communication System Support European Research Seminar on Advances in Distributed Systems, May 2001, XP002285.
European Search Report for Application No. 03 814 628.8-2211 mailed on Oct. 11, 2005.

* cited by examiner

*Primary Examiner*—Pierre-Michel Bataille
(74) *Attorney, Agent, or Firm*—McDonald Hopkins LLC

(57) ABSTRACT

In a clustered processing system, replication logic controls replication of objects to one or more replica states. The replication logic determines differences between states of an object. The one or more replica states can then be generated on other nodes in the clustered system from the differences without transmitting the entire state of the object.

25 Claims, 3 Drawing Sheets

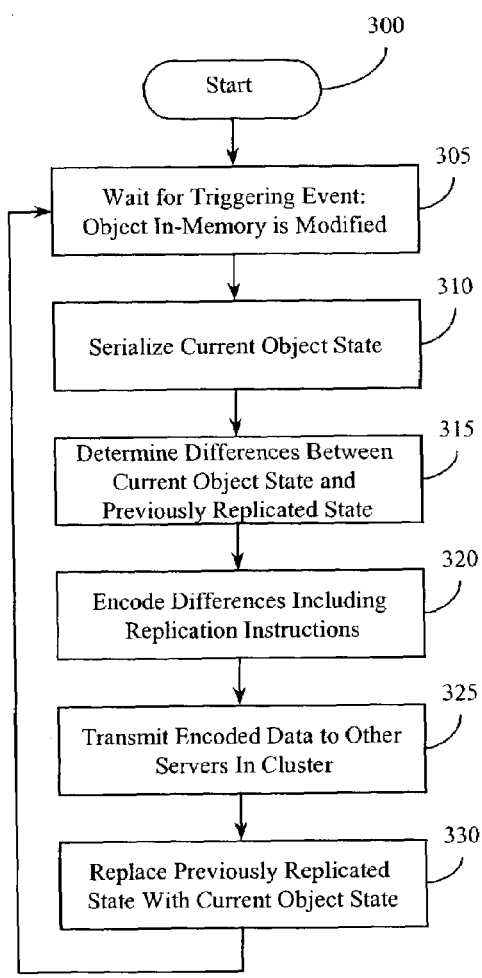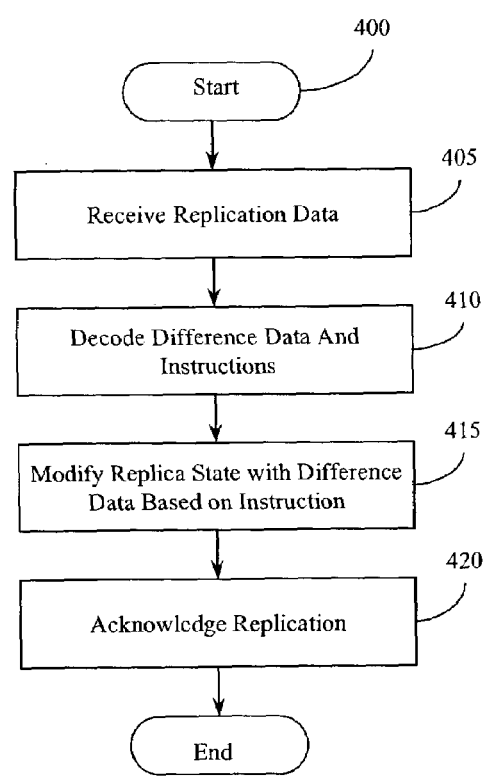
Figure 3
Figure 4

DELTA OBJECT REPLICATION SYSTEM AND METHOD FOR CLUSTERED SYSTEM

RELATED APPLICATIONS

The present application is related to co-pending U.S. patent application entitled "Data Replication System and Method for Clustered Systems," inventor Kevin K. Chang, filed on Nov. 19, 2002, Ser. No. 10/229,616, and assigned to the present assignee, which is incorporated herein by reference.

FIELD OF THE INVENTION

The invention relates to the clustered computer system arts. It finds particular application to a clustered system having a data replication system and method.

BACKGROUND

A cluster is a set of application server instances, running on independent servers, configured to act in concert to deliver greater scalability and availability than a single instance can provide. While a single application server instance can only leverage operating resources of a single host, a cluster can span multiple hosts, distributing application execution over a greater number of CPUs. While a single application server instance is vulnerable to the failure of its host and operating system, a cluster can continue to function despite the loss of an operating system or host, hiding any such failure from clients.

In enterprise applications that are clustered, servers are configured to multicast states (sessions) for in-memory replication. This ensures that when one server goes down, the clients will immediately redirect to the server that has backedup all the other states. Hence the transactions are continued without interruption.

In prior systems, in-memory replication was performed by replicating entire states and objects from one server to another. In the case of Enterprise Java Beans (EJB) end-of-call replication configuration, each time an object is changed, its entire content is broadcasted to the network via multicast and is replicated by another server. While this may not cause problems on small object replications, it may cause network congestion for applications where the objects are large. Network traffic may be further increased due to the tendency of the multicast protocol to drop messages. When messages are dropped, they would need to be resent, further increasing access latency. Thus, as the amount of transmitted data increases, the probability of dropped messages increases causing additional re-transmission of data.

The present invention provides a new and useful method and system of object replication that addresses the above problems.

SUMMARY

In one embodiment, in a clustered data processing system where a first computer system includes an in-memory object and a second computer system includes a replica state of the in-memory object, a system for replicating a current state of the in-memory object is provided. The system comprises a previously replicated state of the in-memory object maintained in the first computer system. Difference logic determines difference values between the current state and the previously replicated state. A communication logic can transmit the difference values to the second computer system to modify the replica state with the difference values.

In accordance with another embodiment, a method of communicating object data between nodes in a clustered data processing system is provided. The method comprises maintaining a current state of the object data in memory in a first node in the clustered data processing system. After a portion of the object data is modified, the portion modified is determined. The portion modified is then transmitted to one or more other nodes in the clustered data processing system in order to replicate the current state of the object data.

BRIEF DESCRIPTION OF THE DRAWINGS

In the accompanying drawings which are incorporated in and constitute a part of the specification, embodiments of a system and method are illustrated which together with the detailed description given below, serve to describe example of the system and method. It will be appreciated that the illustrated boundaries of elements (e.g. boxes or groups of boxes) in the figures represent one example of the boundaries. One of ordinary skill in the art will appreciate that one element may be designed as multiple elements or that multiple elements may be designed as one element. An element shown as an internal component of another element may be implemented as an external component and vise versa.

FIG. 3 is an example methodology of replicating data to a failover node; and

FIG. 4 is an example methodology of replicating data within a failover node.

DETAILED DESCRIPTION OF ILLUSTRATED EMBODIMENTS

The following includes definitions of selected terms used throughout the disclosure. Both singular and plural forms of all terms fall within each meaning:

"Computer-readable medium" as used herein refers to any medium that participates in directly or indirectly providing instructions and/or data to a processor for execution. Such a medium may take many forms, including but not limited to, non-volatile media, volatile media, and transmission media. Non-volatile media may include, for example, optical or magnetic disks. Volatile media may include dynamic memory. Transmission media may include coaxial cables, copper wire, and fiber optic cables. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other medium from which a computer can read.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Signal", as used herein, includes but is not limited to one or more electrical signals, analog or digital signals, one or more computer instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software, computers or other devices, or combinations of these.

Figure 1:
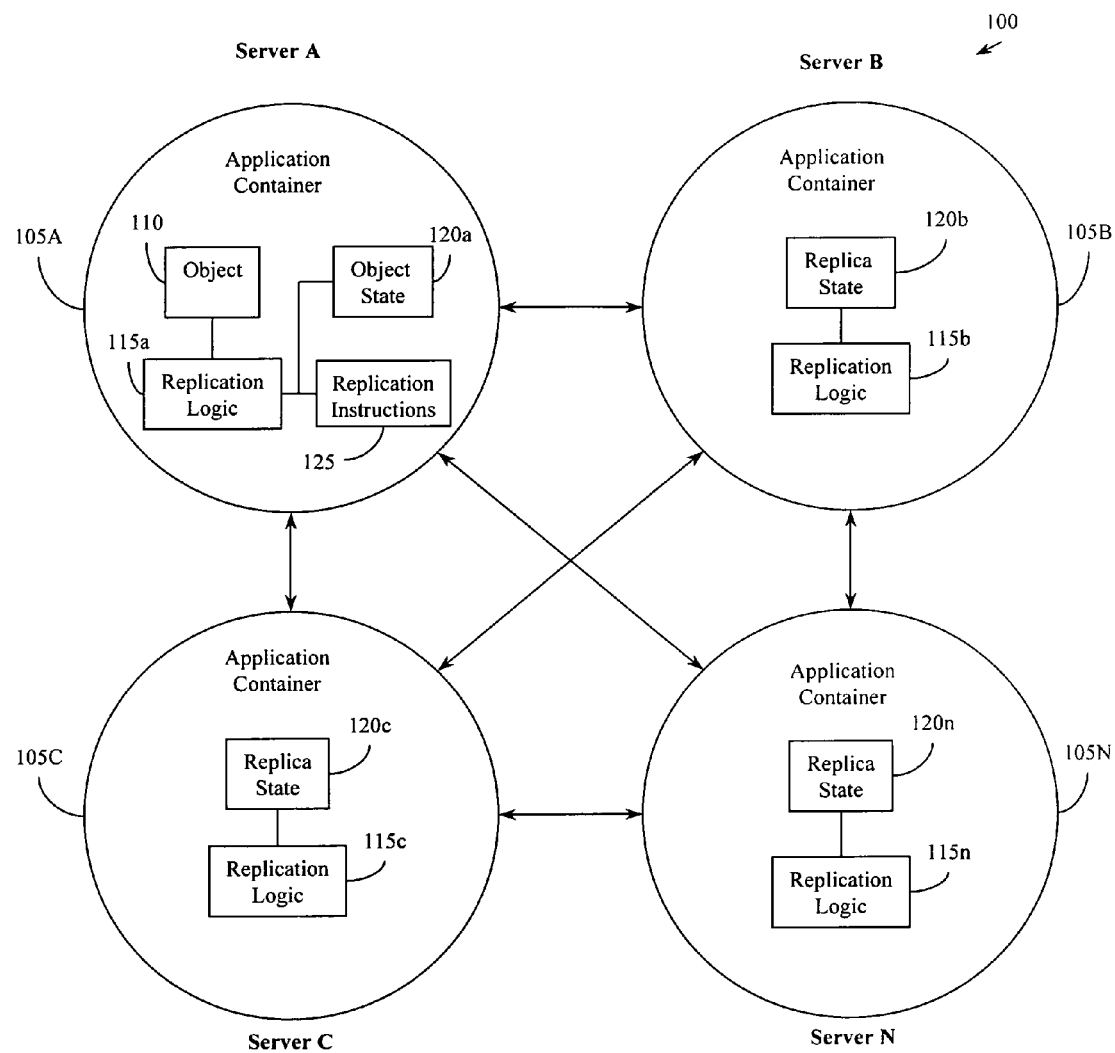
FIG. 1 is an example system diagram of one embodiment of a clustered system having a replication system in accordance with the present invention.

Illustrated in FIG. 1 is one embodiment of a clustered processing system 100. Each node 105A–N includes a replication system that replicates in-memory objects to other nodes by transmitting replication instructions rather than the entire object. Generally speaking, a cluster is a group of independent servers or nodes 105A–N that collaborate as a single system. Cluster components may include one or more processor nodes such as servers A–N, a cluster interconnect (private network) that provides node-to-node communication, and a storage subsystem (not shown) that maintains shared data files on one or more data storage devices. The servers can share disk access and resources that manage the shared data files. Each node 105A–N may be an independent computer system with its own dedicated system memory as well as its own operating system and application software. It will be appreciated that different numbers of nodes 105A–N may be used in the cluster, they may be clustered in different configurations, and each node may have a different configuration from other nodes. Clusters can provide improved fault resilience and modular incremental system growth over single symmetric multi-processors systems. In the event of subsystem failures, clustering ensures high availability. Redundant hardware components, such as additional nodes, interconnects, and shared disks, provide higher availability. Such redundant hardware architectures avoid single points-of-failure and provide fault resilience.

In one embodiment, one or more clients/users may access the cluster 100 through a load balancer (not shown) which is programmed to send client requests to any application server in nodes 105A–N in the cluster 100. The load balancer may be a separate server or a software subsystem within one or more nodes 105A–N. A client may access the cluster through the Internet, an intranet or other communication network.

With further reference to FIG. 1, a simplified example configuration of node 105A having a data replication system is shown. In this example, the node 105A may be configured to execute a business enterprise application such as on a Java 2 Enterprise Edition (J2EE) platform, a Microsoft .NET platform or another desired platform. Accordingly, the clustered system 100 includes clustered enterprise applications of the selected platform. The following description will be based on a J2EE platform. Of course, other types of software products and applications may be used rather than a business enterprise application. The system may also include a clustered database system. The system may also be implemented on various operating systems such UNIX, Windows, Linux or other available systems.

Each node 105A–N may be an application server that is configured and programmed by software to provide a J2EE environment, typically referred to as a container for J2EE. One example is Oracle Container for Java (OC4J) software. The container, which can have one or more container instances, is programmed in Java and executes on a standard Java Development Kit (JDK) virtual machine. It provides a J2EE environment that may include a variety of features such as a Java Server Page (iSP) translator, a Servlet engine, an Enterprise Java Beans (EJB) container and other J2EE services such as INDI, Java Database Connectivity (JDBC), Java Message Service (JMS) and others.

Node 105A includes a replication logic 115a to control replication of an object that may be within an application container. Replicating data to another node in the cluster creates a failover instance so that processing can continue if processing were interrupted for any reason. Any portion of the server instance 105A, which will be referred to as an object, can be replicated including the entire state of the server instance 105A, any container instance, one or more container processes and combinations of these. The data within an object will be generally referred to object data or instance data.

With further reference to FIG. 1, an object 110 is maintained in memory by an application container in server A. The object 110, for example, maintains data for an active process such as financial transaction data, shopping cart data and history, user preferences, etc. As the data is changed by a user, the object 110 is modified thus changing its state. To provide failover capabilities in the cluster system 100, the current state of the object 110 is replicated to other servers in the cluster to serve as backup. The object data may be replicated at any desired time or frequency but typically, object data is replicated each time its state changes. To replicate the state, the replication logic 115a collects the data from the object 110 and determines differences between the current state and a previously replicated state. The differences will be referred to difference values or difference data.

This assumes that an object state has been previously replicated and stored. The differences are then transmitted to the other servers in the cluster where each will update its version of the replica state with the differences. Each server A–N also includes a replication logic 115a–n, respectively, to perform the replication. Transmitting the differences can reduce network traffic since the entire object state is not sent. This is noticed most in the case where a large object state only changes a small portion of its data.

To allow the other servers to properly generate a replica state, the replication logic 115a may also generate one or more replication instructions 125. These instructions are associated and transmitted with the difference data. The instructions, for example, instruct the replication logic 115b–n of a receiving node 105 how its replica state 120b–n is to be modified or updated such that it becomes an identical replica of the current object state 120a. In this manner, it is not necessary to transmit the entire object state 120a during replication. The replication instructions may include the location of each modified portion, the content of the modified data, instructions to add/delete data from the replica state 120*b–n*, and/or other instructions to modify the replica states 120*b–n*. By transmitting only the modified data of the current object state 120*a*, network traffic is reduced as well as system latency.

Figure 2:
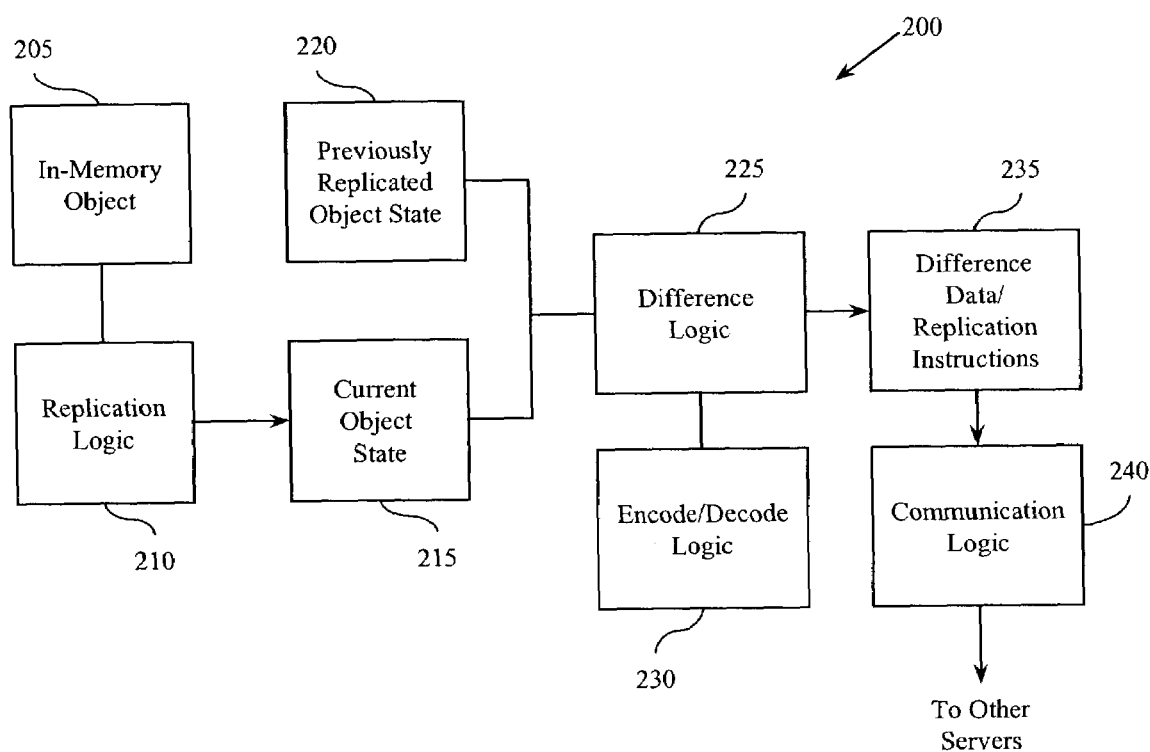
FIG. 2 is a diagram of another embodiment of a replication system within a cluster node.

Illustrated in FIG. 2 is another embodiment of a replication system 200 used to replicate an in-memory object 205 in a clustered processing system. Each server in the clustered system would have the replication system 200 or a similar embodiment so that each server may replicate their own in-memory objects to other servers and receive replica states from other servers. It will be appreciated that the format of transmitted data is predetermined so that each replication logic correctly process the data. An example of such a format is described below.

In a J2EE environment, objects such as Enterprise Java Bean (EJB) objects are maintained as logical or abstract data including pointers, addresses and/or other data structure components that identify the data that belongs to the object. The data may be physically stored in separate and multiple locations. Current communication protocols typically do not allow data to be transmitted in this type of logical form. Rather, the object data 205 is converted into a form that is transmittable such as one or more byte arrays. For example, each time the in-memory object 205 is to be replicated, serializing logic serializes the data and stores the serialized form as a current object state 215. The serializing logic may be part of the replication logic 210 or invoked therefrom as a separate piece of logic.

Also maintained with the current object state 215 is a previously replicated state 220 of the object 205. In other words, state 220 represents the previous state that was replicated to other servers. Of course, the first time that object 205 is replicated, the previously replicated state 220 would not exist or be null. As mentioned previously, the replication system reduces the amount of data to be replicated to other nodes in the cluster by transmitting the changed data made to the object 205, which can be referred to as delta object. In this embodiment, the changes made to the object 205 are identified by determining the differences from the current state 215 of the object and its previous state 220.

To determine the delta object or modified portions of the current object state 215, difference logic 225 analyzes the data between the current state 215 and the previously replicated state 220. Determining the differences between the states may be performed in a variety of ways. For example in one embodiment, the difference logic 225 can compare the data in each state bit by bit to determine what has changed. In another embodiment, a difference algorithm can be applied to the previous and current object states to determine a more efficient difference. Such an algorithm may include the longest common subsequences algorithm, a revision control system, or other algorithm to determine differences between data. The differences between the previous state 220 and current state 215 are identified and copied as a set of difference data 235 which is transmitted for replication to other nodes in the cluster. This reduces the load on the network. For example, if one bit in an object state array is modified, it is not necessary to transmit the entire array for replication. Rather, once a node in the cluster contains a previous replica state of the array, the node can update the replica state by receiving the modified bit.

With further reference to FIG. 2, an encode/decode logic 230 generates instructions to be transmitted with the difference data 235 instructing a receiving node as to how to modify its replica state using the new difference data 235. For explanatory purposes, the term replication data will be used to denote data that is transmitted for replication on other nodes. This data includes the difference data 235 and may include additional information such a header information, replication instructions for updating replica states, and/or other data that may be needed for the communication protocol that is used. Thus, when a node receives replication data, its internal encode/decode logic decodes the data to determine what the difference data is and what replication instructions are associated with the difference data. In accordance with the replication instructions, a preexisting replica state within that node is updated with the difference data such that the current state of the object 205 is replicated. From the serialized form of the object state, the object 205 may then be recreated into its logical form so that it can be used as a failover object.

As an example, suppose an object s1 is set as follows: String s1[0]=new String[2]; s1[0]="abcde". Serializing the object into a byte array representation using, for example, Java's ObjectOutputStream may be as Array1:

```
-84 -19 0 5 ur 0 19 91 Ljava 46 lang 46 String 59
  -83 -46 V -25 -23 29 123 G 2 0 0xp 0 0 0 2
  t 0 5 abcdep
```

Near the end of the byte array, the "t 0 5" is a Java code meaning that the following is a text "t" string with "05" characters which are "abcde". Upon the following change: s2[1]="123", a new byte array representation may be as Array2:

```
-84 -19 0 5 ur 0 19 91 Ljava 46 lang 46 String 59
  -83 -46 V -25 -23 29 123 G 2 0 0xp 0 0 0 2
  t 0 5 abcdet 0 3 1 2 3
```

The end of the byte arrays shows "t 0 3" which indicates that the following three characters are text. Sending the updated object across the network for replication would be sixty one (61) bytes of data. But running the difference logic 225 algorithm as described above would determine the differences between Array1 and Array2 and generate replication instructions. For example, the replication instructions may be: "Change byte 55 (p) to 55–60 (t 0 3 1 2 3)". This uses a psuedo-code format to indicate that byte location 55 which has a value "p" is to be changed to "t 0 3 1 2 3" that is in byte locations 55–60. Of course, other formats of instruction codes can be used such as human readable codes, machine readable codes, or a combination of both. When received by a node, the node would modify its preexisting state of the object, which would be Array1, based on the instructions to obtain Array2, the new state of the object. Encoding the replication instruction in an arbitrary format would be less than ten (10) bytes, a significant savings on the network rather than transmitting the entire Array2.

To control the communication between nodes in the cluster, each node includes a communication logic 240 responsible for transmitting and receiving data there between. A variety of communication protocols can be used, for example, the multicast protocol that broadcasts data to all nodes in the network. Data may also be transmitted to a designated node by identifying its address or other network identifier to which the data is to be sent.

Illustrated in FIG. 3 is one embodiment of a methodology 300 associated with the replication of objects in a clustered system. The illustrated elements denote "processing blocks" and represent computer software instructions or groups of instructions that cause a computer to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, does not depict syntax of any particular programming language. Rather, the diagram illustrates functional information one skilled in the art could use to fabricate circuits, generate computer software, or use a combination of hardware and software to perform the illustrated processing. It will be appreciated that electronic and software applications may involve dynamic and flexible processes such that the illustrated blocks can be performed in other sequences different than the one shown and/or blocks may be combined or, separated into multiple components. They may also be implemented using various programming approaches such as machine language, procedural, object oriented and/or artificial intelligence techniques. The foregoing applies to all methodologies described herein.

FIG. 3 illustrates one methodology 300 that is performed on a server that is replicating an object contained therein. In this example, the process will be described based on a configuration that replicates the current state of an object each time the object is modified. When the triggering event occurs, the process begins (block 305). Of course, other triggering events can be used such as time intervals, occurrences of certain events, or other desired times. If the object data is in an abstract or logical configuration that cannot be transmitted directly, the object data is serialized into a form that is transferable over a network (block 310). This may include serializing the object data into one or more byte arrays.

The differences between the current object state and a previously replicated state is then determined (block 315). This assumes that a previously replicated state has been created and maintained on the node. In the case where the object is replicated for the first time, a previously replicated state would not exist or be null, in which case, the entire serialized object state would be transmitted to other nodes for replication. As previously mentioned, the differences may be determined in a variety of ways including bit-by-bit comparison or other types of difference algorithms. Replication data is then generated by encoding the differences together with any replication instructions corresponding to the differences (block 320). The replication instructions may include code indicating the location within the replica state where the difference data is to be placed. The encoded replication data is then transmitted to other servers in the cluster (block 325). Upon successful replication, the previously replicated state within the current server is replaced with the current object state making the current object state the previously replicated state (block 330). The process then repeats each time an object is to be replicated.

Illustrated in FIG. 4 is one embodiment of a methodology 400 that may be performed on a node that receives replication data to create a replication state of an object maintained by a different server. The replication process begins when replication data is received from another node (block 405). The data is decoded, such as by parsing, to extract the replication instructions and difference data which is to update the replica state (block 410). The replica state is then modified by changing its content with the difference data based on the instructions (block 415). This may include modifying existing values in the replica state, adding new values, or deleting values. If the data as accurately received and replicated, the node may send an acknowledgement to the source node (block 420). The process would then repeat each time replication data was received.

Suitable software for implementing the various components of the present system and method are readily provided by those of skill in the art using the teachings presented here and programming languages and tools such as Java, Pascal, C++, C, CGI, Perl, SQL, APIs, SDKs, assembly, firmnware, microcode, and/or other languages and tools. The components embodied as software include computer readable/ executable instructions that cause a computer to behave in a prescribed manner. Any software, whether an entire system or a component of a system, may be embodied as an article of manufacture and/or stored in a computer-readable medium as defined previously. It will be appreciated that components described herein may be implemented as separate components or may be combined together. For example, the replication logic 210, the difference logic 225, and the encode/decode logic 230 shown in FIG. 2 may be embodied as one component.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. In a clustered data processing system where a first computer system includes an in-memory object comprising both data and methods and a second computer system includes a replica state of the in-memory object comprising both the data and the methods, a system for replicating a current state of the in-memory object comprising:
   a previously replicated state of the in-memory object maintained in the first computer system;
   a difference logic for determining difference values for both the data and the methods of the in-memory object between the current state and the previously replicated state; and
   a communication logic for transmitting the difference values to the second computer system to modify the replica state with the difference values.

2. The system of claim 1 further including encoding logic for generating replication instructions, associated with the difference values, that instruct the second computer system how to modify the replica state.

3. The system of claim 1 further including replication logic having a data serializer to serialize the current state of the in-memory object.

4. The system of claim 1 wherein the previously replicated state is stored in one or more byte arrays.

5. The system of claim 1 wherein the system is embodied as computer executable instructions stored on a computer-readable medium.

6. The system of claim 1 wherein the in-memory object is an object in an enterprise application.

7. A clustered data processing system comprising:
   a plurality of nodes clustered in a communication network where each of the nodes includes:
   replication logic for replicating an in-memory object to one or more other nodes where the in-memory object comprises data and methods;
   a previously replicated state of the in-memory object maintained by the replication logic where the previously replicated state is a state that has been replicated on the one or more other nodes;

a current object state comprising the data and the methods of the in-memory object;

difference logic for determining differences of the data and the methods between the current object state and the previously replicated state; and encoding logic for generating replication codes based on the differences where the one or more other nodes can replicate the current object state with the replication codes without receiving the current object state.

8. The clustered data processing system as set forth in claim 7 further including communication logic for transmitting and receiving replication codes between the plurality of nodes for creating replica states.

9. The clustered data processing system as set forth in claim 7 wherein the current object state and the previously replicated state are serialized forms of the in-memory object.

10. The clustered data processing system as set forth in claim 9 wherein the replication logic includes logic for serializing the current object state and the previously replicated state.

11. The clustered data processing system as set forth in claim 7 wherein the difference logic includes logic for applying a difference algorithm.

12. The clustered data processing system as set forth in claim 7 further including decode logic for decoding the replication codes to create a replica state based on the differences.

13. The clustered data processing system as set forth in claim 7 wherein the replication logic includes means for replicating the in-memory object.

14. The clustered data processing system as set forth in claim 7 wherein the clustered data processing system includes clustered enterprise applications.

15. A method of communicating object data and methods of an object between nodes in a clustered data processing system, the method comprising the steps of:

maintaining a current state of the object data and methods in memory in a first node in the clustered data processing system, and maintaining a previously replicated state of the object data and methods in the first node;

after a portion of the object data and methods is modified, determining the portion modified by comparing with the previously replicated state; and transmitting the portion modified to one or more other nodes in the clustered data processing system in order to replicate the current state of the object data and methods.

16. The method as set forth in claim 15 further including generating instruction codes to be transmitted with the portion modified where the instruction codes instruct the one or more other nodes how to replicate the current state.

17. The method as set forth in claim 15 further including serializing the object data and methods before the transmitting step.

18. The method as set forth in claim 17 further including;
serializing the current state of tho object data and methods;
serializing a modified state of the object data and methods after the portion is modified; and
applying a difference algorithm between the serialized states to determine the portion modified.

19. The method as set forth in claim 18 wherein the applying step includes applying a longest common subsequences algorithm.

20. An article of manufacture embodied in a computer-readable medium for use in a clustered computer system for replicating a current state of an object comprising data and methods where one or more modifications have changed the object from a previous state, the article of manufacture comprising:

first computer executable instructions for causing a computer to determine differences between values of the current state and the previous state of the object data and methods; and second computer executable instructions for causing a computer to generate one or more replication instructions for instructing another computer to replicate the current state of the object data and methods from the previous state based on the differences.

21. The article of manufacture as set forth in claim 20 further including third computer executable instructions for causing a computer to serialize the object into the current state.

22. The article of manufacture as set forth in claim 20 further including fourth computer executable instructions for causing a computer to maintain the previous state in a serialized form.

23. The article of manufacture as set forth in claim 20 wherein the first computer executable instructions include instructions that apply a difference algorithm to determine the differences between the current state and the previous state.

24. The article of manufacture as set forth in claim 23 wherein the difference algorithm is based on a longest common subsequences algorithm.

25. The article of manufacture as set forth in claim 20 further including fifth computer executable instructions for causing a computer to transmit the replication instructions and the differences of the object data and methods to one or more computers clustered together such that the object data and methods may be replicated in the one or more computers without receiving the current state of the object.

* * * * *

UNITED STATES PATENT AND TRADEMARK OFFICE
CERTIFICATE OF CORRECTION

PATENT NO. : 7,206,910 B2
APPLICATION NO. : 10/321336
DATED : April 17, 2007
INVENTOR(S) : Kevin K. Chang and Harlan B. Sexton Page 1 of 1

It is certified that error appears in the above-identified patent and that said Letters Patent is hereby corrected as shown below:

On the front page, Item (56) under OTHER PUBLICATIONS, "Tomcast" should read -- Tomcat 4 --.
On the front page, Item (56) under OTHER PUBLICATIONS, "Apr. 4, 2002" should read -- Apr. 2002 --.
On the front page, Item (56) under OTHER PUBLICATIONS, "article.html" should read -- article.html) --.
Col. 1, Line 37, "backedup" should read -- backed-up --.
Col. 2, Line 19, "example" should read -- example embodiments --.
Col. 2, Line 27, "vise" should read -- vice --.
Col. 4, Line 31, "to object" should read -- to as object --.
Col. 4, Line 47, "to difference" should read -- to as difference --.
Col. 6, Line 18, "s1[0] = new" should read -- s1[] = new --.
Col. 8, Line 5, "firmnware" should read -- firmware --.
Col. 10, Line 5, "tho" should read -- the --.

Signed and Sealed this

Tenth Day of July, 2007

JON W. DUDAS
*Director of the United States Patent and Trademark Office*